United States Patent

[11] 3,543,630

| [72] | Inventors | Robert L. Ferris;<br>Daniel W. Martin, Cincinnati, Ohio |
|---|---|---|
| [21] | Appl. No. | 736,706 |
| [22] | Filed | June 13, 1968 |
| [45] | Patented | Dec. 1, 1970 |
| [73] | Assignee | D. H. Baldwin Company<br>Cincinnati, Ohio<br>a corporation of Ohio |

[54] COMPACT PIANO CONSTRUCTION
13 Claims, 6 Drawing Figs.

[52] U.S. Cl. .................................... 84/177,
84/184, 84/191
[51] Int. Cl. ......................................... G10c 3/02,
G10c 3/04, G10c 3/06
[50] Field of Search ............................ 84/184–
–188, 191, 200, 470, 177, 174, 240

[56] References Cited
UNITED STATES PATENTS
| Re20,144 | 10/1936 | Lundholm .................. | 84/174 |
|---|---|---|---|
| 2,505,803 | 5/1950 | Stein ............................ | 84/184X |
| 2,505,805 | 5/1950 | Stein ............................ | 84/174 |
| 2,806,398 | 9/1957 | Machalek.................... | 84/240 |
| 3,296,917 | 1/1967 | Finholm ...................... | 84/240 |

*Primary Examiner*—Richard B. Wilkinson
*Assistant Examiner*—John F. Gonzales
*Attorney*—Melville, Strasser, Foster & Hoffman ABSTRACT: A compact piano construction having the playing action and the tuning action in essentially horizontal alignment, with the tuning pins of the tuning action preferably projecting rearwardly from the instrument, the instrument being further characterized by the suspension of the playing action and the string plate which incorporates the tuning action from an opposing pair of case defining end walls connected together by a plurality of rigidifying rails, the string plate being shock mounted to effectively free the playing action from mechanical interconnection to the string plate.

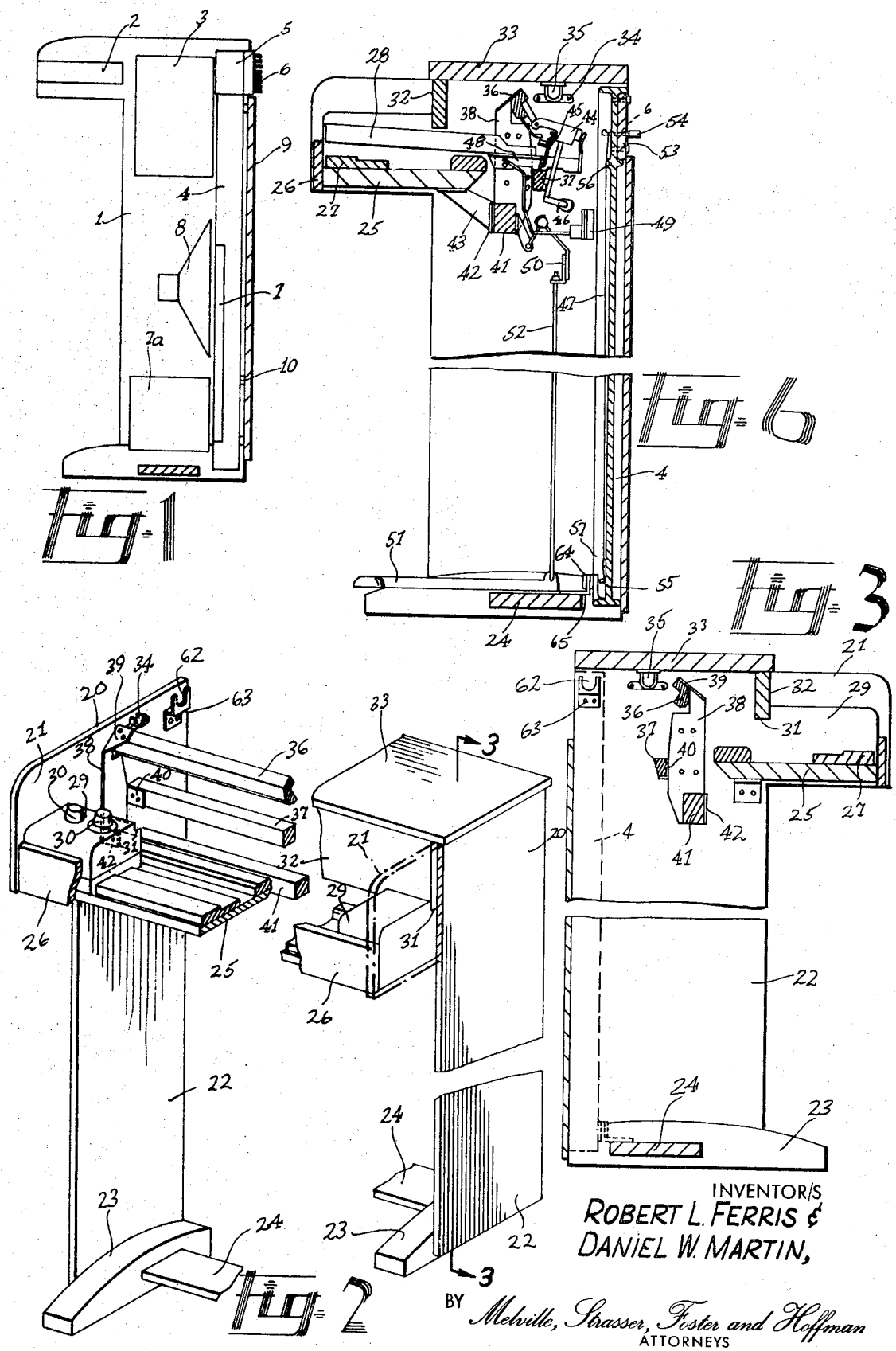

Patented Dec. 1, 1970

3,543,630

INVENTOR/S
ROBERT L. FERRIS &
DANIEL W. MARTIN

BY *Melville, Strasser, Foster and Hoffman*
ATTORNEYS

COMPACT PIANO CONSTRUCTION

BACKGROUND

The instant invention relates primarily to pianos and electropianos and more particularly to an extremely compact instrument which is particularly suited for teaching purposes, although its utility is not so limited and the instrument may be used for any desired purpose. In recent years there has been a trend toward mass instruction utilizing electronic teaching facilities. The electropiano is particularly suited to such teaching methods in that the sound reproducing system may be controlled so that its output may be heard only by the use or of earphones. Thus, a large number of students may receive instructions and may practice in a single room without interfering with each other. Similarly, the output of each instrument may be channeled to a master console under the control of the instructor who may selectively listen to the playing of the various students in the class.

Most currently available pianos are relatively large and do not readily lend themselves to group instruction. Their size imposes a limitation on the number of instruments which can be placed in a given classroom, particularly if adequate aisle space is to be provided so that the instructor may readily move among the students for on-the-spot instruction. Pianos suitable for teaching purposes are generally of the upright variety and, due to their construction, have backs which project substantially above the level of the keyboard. Such construction impairs the ability of the instructor to view the keyboard and to observe the student's hands as the instrument is being played. This is particularly true if the instructor is endeavoring to observe the student's playing technique from a central location. Moreover the student has similar or even greater difficulty in seeing the instructor demonstrate at a central keyboard.

Another limiting factor on the use of present day instruments for teaching purposes is their cost. Most such instruments are relatively expensive in that conventional piano design is utilized in their construction. The effective use of mass teaching techniques demands instruments which, in addition to being relatively inexpensive, are so constructed that they may be readily and easily tuned or repaired, including the ready replacement of worn or broken parts.

Previous attempts to overcome these factors by electrical methods and means have resulted in instruments which in some instances have been less costly, but usually at the expense of keyboard range. In addition, such instruments have been unsatisfactory in both tone and key touch, and the cases still extend too far above keyboard height for good visibility of playing motion. The The present invention overcomes the foregoing disadvantages by providing an extremely compact instrument which embodies a unique organization and arrangement of operating parts which permit extreme compactness and a material reduction in the overall height and depth of the instrument, the top of instrument case being at normal table or desk height and only slightly above the level of the keys. The top of the case is preferably flat and conveniently located so as to serve as a desk top on which the student may conveniently place a notebook or the like for writing and reading purposes.

The compactness of the instrument is due in part to utilization of a a playing action constructed in accordance with the teachings of U.S. Pat. application Ser. No. 680,620, filed Nov. 6, 1967, now U.S. Pat. No. 3,472,113, and entitled COMPACT PIANO ACTION wherein one of the coinventors hereof has disclosed several embodiments of a playing action which may be utilized in the practice of the present invention.

RESUME OF THE INVENTION

A principal object of the present invention is the provision of an extremely compact stringed instrument, preferably an electropiano, composed of a playing system made up of keys which are operatively connected to a playing action consisting of the hammer and damper mechanism, and a vibrating system including a string plate which mounts the pin block and tuning pins making up the tuning action. The playing action and the tuning action are in horizontal alinement as are the keys, and the tuning action includes a pin block preferably having rearwardly projecting tuning pins. The string plate is shock mounted so as to effectively eliminate dynamic interconnection between the playing system and the vibrating system at audible frequencies, thereby minimizing the sensitivity of the vibratory system to mechanical noise generated by the playing system and to mechanoelectric feed back of loudspeaker vibrations to transducer elements on the string plate.

A further object of the invention is the provision of a simplified instrument construction wherein the keybed and keys, the hammer and damper actions, and the vibrating system, are each suspended between and supported from an opposing pair of end walls defining the major components of the piano case.

Still a further object of the invention is the provision of a construction wherein the entire playing action is mounted on a set of supporting rails being extending between the opposing case defining end walls, the supporting rails being secured at each end to a common bracket detachably mounted on the the end walls, the arrangement being such that the entire playing action may be readily removed for servicing and repairs. Similarly, the keys may be readily removed for repair or replacement.

The case is provided with a cover which comprises a horizontal top adapted to seat on the tops of the end walls and a downwardly projecting front portion which terminates immediately above the plane of the keys. The cover is held in position by simple mounting brackets on the end walls which engage mating brackets secured to the inside of the cover, the cover being readily removable simply by lifting it upwardly. While suitable coverings may be provided for the rear of the instrument and also the front portion underlying the keys, such coverings, together with the top cover itself, are not relied upon to strengthen or rigidify the case but rather are primarily for decorative or acoustical purposes. In effect, the case can be essentially flexible with the playing action supporting rails and keybed support serving as the rigidifying member.

While primarily designed for use as an electropiano wherein transducer means are provided to pick up, amplify and radiate the sounds produced when the keys are struck, the instrument may also be used as a mechanoacoustic piano by the addition of a sounding board and bridge construction. To this end, the sounding board may be affixed to the rear surface of the string plate with the bridge projecting forwardly from the sounding board for contact with the strings.

THE DRAWINGS

FIG. 1 is a schematic vertical sectional view illustrating the general organization of the components of an instrument constructed in accordance with the invention.

FIG. 2 is a fragmentary perspective view of parts broken away illustrating the basic case construction and the mounting of the supporting rails.

FIG. 3 is a vertical sectional view taken along the line 3–3 of FIG. 2.

FIG. 6 is a vertical sectional view taken along the irregular line 6–6 of FIG. 4 illustrating the playing system and the vibratory system.

DESCRIPTION OF THE PREFERRED EMBODIMENT

Figure 4:
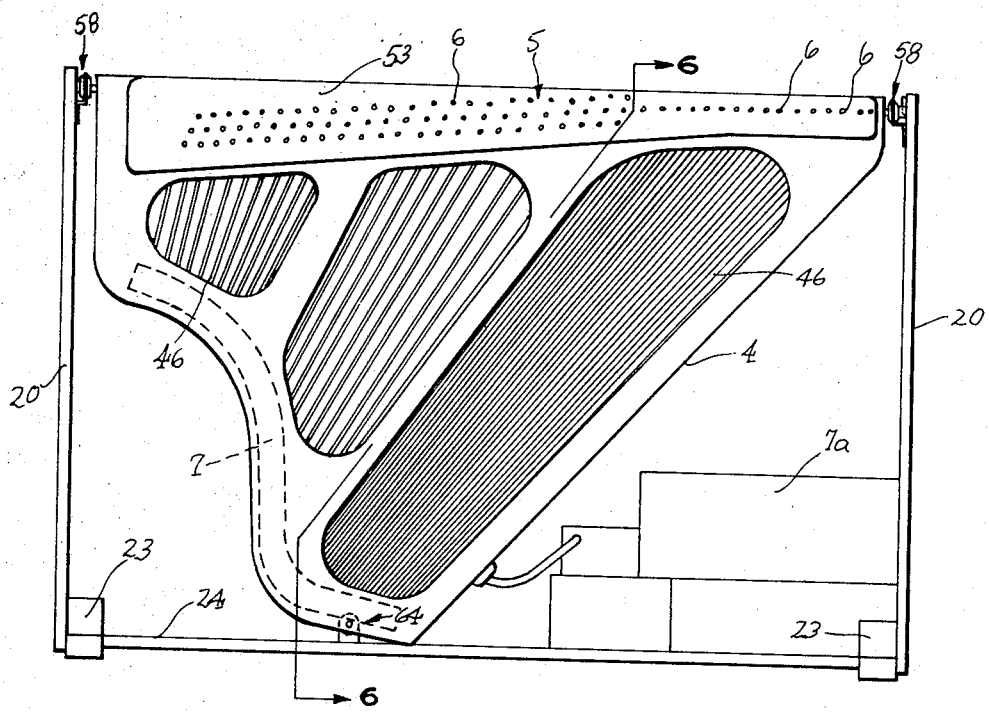
FIG. 4 is a rear elevational view showing the mounting of the string plate and the location of the tuning pins.

Referring first to FIG. 1, which schematically illustrates the location of the various components of the instrument against the profile of the case 1, the moving system is composed of the keys 2 and the hammers and dampers which form the playing action 3 which lies rearwardly of the keys with the hammer actuating mechanism at substantially the same horizontal level as the keys. The vibrating system, which includes the string plate 4 and tuning action 5 lies to the rear of the case, with the tuning action 5 in generally horizontal alinement both with the keys 2 and the hammer actuating mechanism of the playing action 3. The tuning pins 6 comprising a part of the tuning action project rearwardly where they are readily accessible for tuning the instrument.

In an electropiano, the case will also house transducer means 7 mechanically coupled to the strings, an amplifier 7a, and a loud speaker 8 for radiating the an amplified sounds generated by the strings. Suitable provision will also be made for earphones for use by the student, together with suitable volume controls and switching means for the selective use of the loud speaker and earphones, as well as means for interconnecting the instrument to a master console or other instructor controlled system. Such controls and electronic teaching system do not constitute a part of the instant invention.

Where the instrument is to be used as a mechanoacoustic piano, the transducer means 7, the amplifier 7a and the speaker 8 will be replaced by a suitable sounding board 9, which may be mounted either on the string frame 4 or on the end walls of the case. The sounding board is provided with a bridge means 10 arranged to contact the strings which are stretched between the tuning pins extending along the uppermost edge of the string frame and a series of hitch pins extending along its lowermost edge, as will be understood by the worker in the art.

With the foregoing general organization in mind, reference is now made to FIG. 2 of the drawings which illustrates the basic components of the case and the mounting means for both the playing system and the vibrating system. The case is composed of an opposing pair of end walls 20 each of which has a forwardly projecting upper portion 21 and a downwardly projecting leg portion 22. Forwardly projecting feet 23 are secured to the lowermost ends of the leg portions 22 and the parts interconnected by a footrail member 24. A keybed frame member 25 extends between the lowermost edges of the forwardly projecting portions 21, and a vertically disposed molding 26 projects upwardly from the forward edge of keybed frame member 25 to mask the keybed and the key frame 27 which is supported on frame member 25.

As seen in FIG. 6, the key frame 27 mounts keys 28 in the usual fashion, the number of keys being determined by the desired range of the instrument. The instrument may be of the conventional 88 note keyboard type, although for teaching purposes 64 note instruments are often used. The present invention, however, lends itself to any desired keyboard range.

Referring again to FIG. 2, key blocks 29 are preferably provided at each end of the keybed member 25 immediately adjacent the inner surface of the forwardly projecting portions 21 of the end walls, the key blocks extending between the end walls and the endmost keys mounted on the keybed. One or both of the key blocks may be utilized to mount volume and switching controls, indicated generally at 30, when the instrument is an electropiano. In addition, each key block may be provided with a ledge 31 extending lengthwise along its rearmost edge against which the bottom edge of front wall 32 of top cover 33 seats when the cover is fitted in position along the uppermost edges of the end walls, although such ledges may be omitted if desired and the front wall permitted to hang freely to the rear of the key blocks, the cover being supported solely by the upper edges of the end walls 20. The cover is held in place by means of fittings 34 secured to the inner surfaces of the end walls which are engaged by mating fittings 35 (see FIGS. 3 and 6) secured to the undersurface of top cover 33. The cover is thus securely fixed in place and yet can be readily removed for access to the underlying components by lifting it upwardly.

The playing action itself is mounted on and supported by the rails 36 and 37 extending between the end walls 20 and secured thereto by means of brackets 38 having ears 39 and 40 to which the ends of the rails 36 and 37, respectively, are secured. A rail 41 is also secured to the brackets by means of the ears 42, and the structure is further rigidified by a plurality of braces 43, one of which is seen in FIG. 6, extending between frame member 25 and rail 41 at spaced apart intervals. As seen in FIG. 6, the rail 36 mounts the hammer butt assembly 44 which is adapted to be actuated by the hammer jack 45 to cause the depending hammer 46 to contact the string 47 when the key 28 is depressed, the hammer jack 45 being attached to rearward extension 48 of the key. It will be noted that the heart of the playing action, namely, the hammer butt and jack, lie in horizontal alinement with the keys and the tuning action, thereby contributing materially to the compactness of the instrument.

The rail 37 mounts the damper 49 and the associated damper actuating mechanism which is also operatively connected to the rearward extension 48 of the key, and the rail 41 mounts the damper control mechanism 50 which is actuated by foot pedal 51 acting through linkage rod 52, the pedal serving, when actuated, to remove all or a substantial portion of the dampers from contact with the strings.

As should now be evident, the entire playing action of the instrument is mounted on and supported by the rails 36, 37 and 41 secured to the end walls 20 by means of the brackets 38, and the entire playing action may be handled as a unit. The entire rail assembly may be readily removed by detaching the brackets 38 and 43, whereupon the assembly may be bodily lifted from the case. The construction of the instrument thus lends itself to a variety of assembly techniques inclusive of the prefabrication of all or part of the playing action.

An important component of the present invention is the string plate 4 which mounts the tuning action 5. As seen in FIGS. 4 and 6, a pin block 53 is mounted horizontally along the upper rear or outermost side of the plate, the pin block mounting the tuning pins 6 which extend through the pin block and the underlying portions of the plate, the innermost ends of the pins having the strings 46 secured thereto, with the outermost or tuning heads 54 of the pins projecting rearwardly where they may be readily engaged by a tuning wrench. Due to the compact size of the instrument, the tuner will have no difficulty in tuning the instrument in that he may readily reach over the top of the instrument either to reach the tuning wrench or to strike the keys during the tuning process. Another procedure for tuning the treble range is to sit at the treble end of the instrument and reach the keys with the left hand, and the damping wedges and wrench with the right hand. The short front-to-back depth of the instrument facilitates this procedure.

As in conventional piano constructions, a single string is preferably used for each note in the lower octaves, whereas in the higher octaves each note normally will be composed of three strings. The strings will be secured at their lower ends about hitch pins 55 and will pass over suitable termination means 56 and 57 which may comprise an integral part of the string plate. The strings will extend in generally parallel relation and cross-stringing is not required. It will be understood, of course, that in the electropiano embodiment of the invention suitable mechanoelectric transducer means will be provided to convert the vibrations of the strings into electrical pulsations which will be amplified as desired and converted into sound by a loud speaker or earphone system. It may be noted, however, that while a preference is expressed for the tuning pins to have their heads projecting rearwardly from the tuning block, there may be circumstances where it would be desirable for the heads of the pins to project forwardly in the direction of the playing action. This is particularly true in instruments having a single string per note throughout their entire range and hence but a single tuning pin per note.

Figure 5:
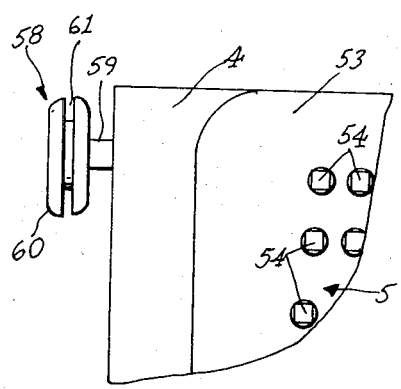
FIG. 5 is an enlarged fragmentary elevational view showing the cushioned mounting means for the string plate.

Since an electropiano is more sensitive to external noise and vibrations, such as are generated by the playing action when the keys are struck, it is desirable to minimize the physical interconnection between the playing system and the vibrating system. To this end, the string plate is suspended from the end walls 20 by means of the shock-resistant fittings 58 which, as best seen in FIG. 5, each comprise a stud 59 fixedly secured to the string plate, the stud mounting a resilient cushion 60 formed from rubber or a similar cushioning material, the cushions each having a vertically disposed annular groove 61 which is adapted to be received in the slot 62 of a mounting bracket 63 (see FIGS. 2 and 3) secured to the inner surface of each of the end walls 20 adjacent its rearmost edge. The positioning of the brackets 63 is such that the string plate will be suspended vertically along the rearmost edges of the end walls. It is also desirable to provide a similar shock-resistant fitting 64 at the lowermost end of the string plate engageable with a bracket 65 mounted on the foot rail 24. The fitting 64 need not be relied upon to support the weight of the string plate but rather is utilized primarily for indexing purposes and to prevent displacement of the string plate when the instrument is moved. The shock mounting of the string plate effectively insulates it from mechanical vibrations induced by the playing action or by contact with the supporting end walls, yet the string plate may be readily removed simply by disengaging the fitting 64 and lifting the plate from the brackets 63.

As should now be apparent, an instrument constructed in accordance with the instant invention is of extremely simple construction and its components may be readily assembled and disassembled, thereby greatly facilitating its manufacture as well as reducing its cost. The instrument is extremely compact, due in large measure to the arrangement of the components which places the hammer assembly of the playing action, together with the keys, and the tuning action at the same horizontal level, preferably with the heads of the tuning pins projecting outwardly from the rear of the instrument where they are readily accessible for tuning purposes. When it is desired to utilize the instrument as a mechanoacoustic piano, a sounding board may be provided, with the strings contacting a vibration transmitting bridge attached to the sounding board.

Modifications may be made in the invention without departing from its spirit and purpose, and consequently it is not intended that the invention be limited other than in the manner set forth in the claims which follow.

We claim:

1. A stringed musical instrument having a case comprising:
    a spaced apart pair of opposing end walls, and frame members interconnecting said end walls;
    a keybed extending between and secured to said end walls toward the front ends thereof, and keys mounted on said keybed;
    a vertically disposed string plate extending between said end walls adjacent the rear edges thereof, said string plate including a pin block mounting a series of horizontally disposed tuning pins, strings extending between said tuning pins and hitch pins on said plate remote from said tuning pins, and bracket means detachably connecting said string plate to said end walls;
    a plurality of supporting rails extending between said opposing end walls between said keybed and said string plate, a hammer and damper action for each string mounted on said rails and in engagement with said keys, and bracket means detachably connecting the opposite ends of said supporting rails to the end walls of said case; and
    said instrument being characterized by the keys, the hammer action, and the tuning action, as defined by said pin block and tuning pins, lying at essentially the same horizontal level with respect to each other.

2. The stringed musical instrument claimed in claim 1 wherein the bracket means detachably connecting said string plate to said end walls includes resilient cushions mounted on the opposite ends of the string plate adjacent the upper end thereof.

3. The stringed musical instrument claimed in claim 2 wherein said cushions each has an annular groove therein engageable in a slotted bracket secured to the adjoining end wall of said case.

4. The stringed musical instrument claimed in claim 1 wherein a sounding board is coupled to said strings through a bridge means.

5. The stringed musical instrument claimed in claim 1 wherein said pin block is mounted on the rear side of said string plate, wherein said tuning pins extend forwardly through said string plate, and wherein said strings extend along the front side of said string plate.

6. The stringed musical instrument claimed in claim 5 wherein said tuning pins have their tuning heads projecting rearwardly from said pin block.

7. The stringed musical instrument claimed in claim 1 wherein said supporting rails are detachably connected to each end wall by common bracket means.

8. A compact stringed musical instrument having a case, a playing system, and a vibratory system:
    said playing system consisting essentially of a series of keys operatively connected to a playing action including hammer actuating mechanism and damper mechanism adapted to be actuated by said keys;
    said vibratory system consisting essentially of a string plate mounting strings positioned to be vibrated when said hammer mechanism is actuated by said keys, and a tuning action having a pin block mounting a plurality of tuning pins to which said strings are attached, said tuning action being in horizontal alinement with said keys;
    said playing action and said vibratory system being suspended within said case, including mounting means detachably connecting said playing action and said vibratory action to said case; and
    said playing system and said vibratory system being arranged with the keys toward the front of the case and the vibratory system at the rear thereof, with the hammer actuating mechanism of the playing action interposed between and in horizontal alinement with the keys and the tuning action.

9. The compact musical instrument claimed in claim 8 wherein the heads of the tuning pins project away from said playing action.

10. The compact musical instrument claimed in claim 9 wherein said playing action and said vibratory system are independently suspended within said case and are essentially free from contact with each other except for contact between the strings of the vibratory system and the hammers and dampers of the playing action.

11. The compact musical instrument claimed in claim 10 wherein the mounting means for said vibratory system includes resilient cushioning means acting to shock mount said string plate relative to said case.

12. The compact musical instrument claimed in claim 11 wherein said case includes a pair of spaced apart end walls, wherein said playing action is mounted on a plurality of supporting rails extending between said end walls, and wherein said string plate is resiliently connected to and suspended from said end walls.

13. The compact musical instrument claimed in claim 12 wherein said supporting rails are mounted on common supporting brackets secured to said end walls.